United States Patent Office 3,062,744
Patented Nov. 6, 1962

3,062,744
PREVENTING HEAT EXCHANGER DEPOSITS
Ralph B. Thompson, Hinsdale, Ill., assignor, by mesne assignments, to Universal Oil Products Company, Des Plaines, Ill., a corporation of Delaware
No Drawing. Filed Aug. 8, 1958, Ser. No. 753,879
12 Claims. (Cl. 252—51.5)

This invention relates to a novel method of preventing heat exchanger deposits.

In most refining operations economies are effected by utilizing the heat contained in hot products of the process to partially or completely heat the charge to the process or other low temperature streams. At the same time this serves to cool the hot products prior to further separation or treatment. This transfer of heat normally is accomplished by passing the hot products in indirect heat exchange with the cooler products. However, difficulty is experienced in the efficient transfer of heat due to the formation of deposits in the heat exchanger, which deposits interfere with the satisfactory transfer of heat and, in extreme cases, result in plugging of the heat exchanger. This in turn means that the unit must be completely shut down in order to clean or replace the heat exchanger. It is apparent that this is a serious problem and incurs great expense in shutting down the unit, both in the cost of cleaning or replacing the heat exchanger, as well as in the loss of products to be marketed. In a preferred embodiment, the present invention is directed to a novel method of preventing such heat exchanger deposits.

A number of additives are available for preventing sediment formation, discoloration and other undesirable deterioration of hydrocarbon oils. However, while many of these additives are effective for the above purpose, they are not satisfactory for use in preventing heat exchanger deposits. An example of such an additive is a copolymer of certain unsaturated compounds to be hereinafter described in detail. It has been found that the property of reducing heat exchanger deposits may be imparted to such a copolymer by forming a particular salt thereof as will be set forth hereinafter in detail.

In one embodiment the present invention relates to a method of preventing deposit formation in a heat exchanger through which two fluids at different temperatures are passed, which comprises incorporating in at least one of said fluids from about 1 to about 1000 parts per million by weight of an oil soluble HCl salt of a copolymer of (1) an unsaturated compound having a polymerizable ethylenic linkage and (2) an unsaturated compound having a polymerizable ethylenic linkage and a basic amino nitrogen, said copolymer containing an aliphatic hydrocarbon side chain of from about 8 to about 18 carbon atoms and said copolymer containing a total of from about 0.1% to about 3.5% by weight of basic amino nitrogen.

In a specific embodiment the present invention relates to a method of preventing deposit formation in a heat exchanger through which at least a portion of a hydrocarbon charge to a process is passed in heat exchange with a portion of hot reactor effluent products, which comprises incorporating in said charge from about 5 to about 100 parts per million by weight of an oil soluble HCl salt of a copolymer of lauryl methacrylate and beta-diethylaminoethyl methacrylate, said copolymer containing from about 0.1% to about 3.5% by weight of basic amino nitrogen, and said salt having from about 1% to about 20% of the amino nitrogen neutralized with HCl.

In order to be effective in preventing sediment formation, discoloration and other deterioration of hydrocarbon oils, the copolymer must meet certain requirements. The copolymer must be oil soluble. It is formed by the addition type copolymerization of two different polymerizable compounds. One of these compounds is amine-free. The other compound must contain a basic amino nitrogen structure. At least one of these compounds must contain from about 8 to about 18 carbon atoms in an aliphatic hydrocarbon side chain. The side chain is not part of the main polymer chain. The copolymer contains from about 0.1% to about 3.5% by weight of basic amino nitrogen and preferably from about 0.2% to about 3% by weight thereof.

Illustrative examples of one of the unsaturated compounds for use in forming the polymer include saturated and unsaturated long chain esters of unsaturated carboxylic acids such as 2-ethylhexyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, and particularly methacrylates including n-octyl methacrylate, n-nonyl methacrylate, 3,5,5-trimethylhexyl methacrylate, n-decyl methacrylate, sec-capryl methacrylate, lauryl methacrylate, dodecyl methacrylate, tridecyl methacrylate, tetradecyl methacrylate, pentadecyl methacrylate, hexadecyl methacrylate, cetyl methacrylate, heptadecyl methacrylate, octadecyl methacrylate, 9-octadecenyl methacrylate, etc.; unsaturated esters of long-chain carboxylic acids such as vinyl laurate, vinyl stearate; long-chain esters of vinylene dicarboxylic acids such as methyl lauryl fumarate; N-long-chain hydrocarbon substituted amides of unsaturated acids such as N-octadecyl acrylamide; long-chain monoolefins such as the alkyl or acyl substituted styrenes as, for example, dodecylstyrene, and the like. A particularly preferred compound is lauryl methacrylate and more particularly technical lauryl methacrylate which is obtained by esterification of a commercial mixture of long-chain alcohols in the $C_{10}$ to $C_{18}$ range derived from coconut oil. The technical lauryl methacrylate is available commercially at a lower price and, accordingly, is preferred. A typical technical lauryl methacrylate will contain in the ester portion carbon chain lengths of approximately 3% $C_{10}$, 61% $C_{12}$, 23% $C_{14}$, 11% $C_{16}$, and 2% $C_{18}$.

The other compound used in the polymerization is a basic amino nitrogen-containing compound, and illustrative examples include the basic amino substituted olefins such as p-(beta-diethylaminoethyl)-styrene; basic nitrogen-containing heterocycles carrying a polymerizable ethylenically unsaturated substituent such as the vinyl pyridines and the vinyl alkyl pyridines as, for example, 2-vinyl-5-ethyl pyridine; esters of basic amino alcohols with unsaturated carboxylic acids such as the alkyl and cycloalkyl substituted aminoalkyl and cycloalkyl esters of the acrylic and alkacrylic acids as, for example, beta-methylaminoethyl acrylate, beta-diethylaminoethyl methacrylate, 4-diethylaminocyclohexyl methacrylate, beta-beta-didodecylaminoethyl acrylate, etc.; unsaturated ethers of basic amino alcohols such as the vinyl ethers of such alcohols as, for example, beta-aminoethyl vinyl ether, beta-diethylaminoethyl vinyl ether, etc.; amides of unsaturated carboxylic acids wherein a basic amino substituent is carried on the amide nitrogen such as N-(beta-dimethylaminoethyl)-acrylamide; polymerizable unsaturated basic amines such as diallylamine, and the like. In this specification and claims the term "basic amino nitrogen" is used in the generic sense to cover the primary, secondary and tertiary amines including, as stated above, the basic nitrogen-containing heterocycles.

In another embodiment, the polymer is derived from the two polymerizable compounds described above and also one or more other polymerizable compounds. The latter compounds do not necessarily contribute towards the oil solubility or the inhibiting or dispersing action of the polymer but serve merely as fillers or extenders for the active components. Typical examples of these filler components include the well-known shorter chain ethylenically unsaturated addition polymerizable monomers such as the vinyl and allyl formates, acetates, propionates, butyrates, and the like; polymerizable unsaturated short-chain hydrocarbons such as the monoolefins as, for example, ethylene, propylene, isobutylene, etc., styrene, vinyltoluene, and the like, and the short-chain dienes such as 1,3-butadiene, isoprene, etc.; unsaturated short-chain carboxylic acids and their derivatives such as the alpha-methylene carboxylic acids and their derivatives as, for example, acrylic acid, methyl methacrylate, acrylonitrile, methacrylamide, etc.; the short-chain unsaturated ethers, particularly the vinyl and allyl ethers as, for example, ethyl vinyl ether, butyl vinyl ether, allyl glycidyl ether, etc. These and other familiar monomers that are available at moderate cost can be employed for this purpose in proportions ranging up to as much as 79%, by weight, in representative polymers, although it is preferred they should not exceed about 65% by weight of the polymer. In addition, inclusion of minor proportions of N-hydrocarbon-substituted amides of unsaturated carboxylic acids may be found beneficial. Especially suitable as polymerizable components of the polymer are the N-hydrocarbon-substituted acrylamides including N-tertiary-butylacrylamide, N-tertiary-octylacrylamide and, particularly the N-acrylacrylamides such as methacrylanilide and acrylanilide.

As hereinbefore set forth, the copolymer contains from about 0.1% to about 3.5% by weight of basic amino nitrogen. This is controlled by the concentration of basic amino nitrogen component used in the copolymerization. Thus, the concentration of amine containing compound generally will be less than one mol per mol of amine-free compound, the specific concentration depending upon the particular amine-containing and amine-free compound or compounds used in the polymerization. A particularly preferred concentration is from about 0.6 to about 0.9 mol proportions of amine-free compound or compounds and about 0.1 to about 0.4 mol proportions of amine-containing compound.

The copolymer is prepared in any suitable manner and, in general, is prepared by heating the reactants in a polymerizing reactor at a temperature which usually will be in the range of from about 40° to about 80° C., at pressures ranging from atmospheric to 3000 pounds per square inch or more, and for a time ranging from 2 to 48 hours or more, preferably in the presence of a catalyst or initiator such as benzoyl peroxide, tertiary butyl peroxide, azo compounds as alpha, alpha'-azodiisobutyronitrile, etc. When desired, the polymerization may be effected in the presence of a solvent. Any suitable solvent may be employed including aromatic hydrocarbons such as benzene, toluene, xylene, ethylbenzene, cumene, etc., paraffinic hydrocarbons including pentane, hexane, heptane, octane, etc., or mixtures including naphtha, kerosene, mineral oil, etc. In some cases the copolymer is to be processed further as a solution in a solvent and conveniently the same solvent is utilized during the polymerization.

As hereinbefore set forth, an HCl salt of the copolymer prepared in the above manner is utilized as an additive to prevent heat exchanger deposits. Preferably only a portion of the amino nitrogens are neutralized. It is recognized that the salt will be less soluble in hydrocarbon oil than the polymer and, therefore, it is important that the extent of neutralization be below that exceeding solubility of the salt in the hydrocarbon oil. At least 0.2% of the amino nitrogens must be neutralized with HCl and, as stated above, the upper limit of neutralization will be that at which solubility of the salt in the hydrocarbon oil is exceeded. The solubility is determined at the concentration of salt to be incorporated in the oil. In general it is preferred that from about 1% to about 20% of the amino nitrogen is neutralized with HCl.

Neutralization of the copolymer is effected in any suitable manner and, in general, is readily accomplished by heating, with stirring, a mixture of the copolymer and HCl. The HCl may be utilized as a gas in a closed system. However, it preferably is utilized as a solution in a suitable solvent including alcohol, water, etc. The lower alcohols are preferred solvents and include methanol, ethanol, propanol and butanol. In general the reaction is effected at ambient or elevated temperature, which may range from about 50° to about 100° C. and, as stated before, with stirring. Higher temperatures may be employed in some cases but generally offer no advantages. When a solvent is employed, it may be removed by distillation under vacuum or in any other suitable manner, although in some cases it may be desirable to market the salt as a solution in the solvent. When water is used as the solvent, the water preferably is removed by azeotropic distillation.

As hereinbefore set forth, a salt prepared in the above manner serves to reduce heat exchanger deposits, whereas the copolymer itself does not possess this property. This will be illustrated more fully in the appended examples.

The salt prepared in the above manner is incorporated in a hydrocarbon oil in an amount of from about 1 to about 1000 parts per million by weight of the hydrocarbon oil and preferably in a concentration of from about 5 to about 100 parts per million, although higher concentrations up to 1% by weight may be used in some cases and thus may range from about 0.0005% to about 1% by weight.

As hereinbefore set forth, the salt of the present invention is used to prevent deposit formation in heat exchangers. In such heat exchange one fluid is passed through tubes or coils disposed in a shell and the other fluid is passed through the shell. The oil heated in this manner then is passed for further treatment, while the oil cooled in this manner is passed to separation or further conversion. It is understood that the hydrocarbon oil may comprise gasoline, naphtha, kerosene, jet fuel, gas oil, burner oil, diesel oil, fuel oil, residual oil, etc.

An example of a process in which the change is passed in heat exchange with hot effluent products is a hydrotreating process in which oil is subjected to hydrogen treating in the presence of a catalyst comprising alumina-molybdenum oxide-cobalt oxide or alumina-molybdenum sulfide-cobalt sulfide. The oil may comprise gasoline, kerosene, gas oil or mixtures thereof and is treated to remove impurities including sulfur compounds, nitrogen compounds, oxygen compounds, metals, etc. The treating is effected at a temperature within the range of from about 500° to about 800° F. or more at hydrogen pressures of from about 100 to about 1000 pounds per square inch or more. The oil charged to the process generally is introduced at a temperature of from ambient to 200° F. and is passed in heat exchange with products withdrawn from the reactor at a temperature of from about 500° to about 800° F. During this heat exchange the charge is heated to a temperature of from about 300° to about 600° F. and then may be heated further in a furnace or otherwise to the temperature desired for effecting the treating. At the same time the hot reactor effluent products are cooled to a temperature of from about 300° to about 600° F. and below that at which they are withdrawn from the reactor. Generally the partly cooled reactor effluent products are cooled further by heat exchange with water or otherwise and then are passed into a separator, wherefrom gases and liquids are each separately withdrawn. Another illustrative example of a process in which the charge is passed in heat exchange with reactor effluent products is a reforming process in which gasoline is contacted with hydrogen in the presence of a platinum-containing catalyst at a temperature of from about 700° to about 1000° F.

An example in which oil is subjected to fractionation and the charge is passed in heat exchange with the hot effluent products is in a crude column. In this column, crude oil is subjected to distillation at a temperature of from about 600° to about 700° F. in order to remove lighter components as overhead and/or side streams. In some cases the charge first is passed in heat exchange with the overhead and/or side streams from this column and then is passed in heat exchange with the hotter products withdrawn from the bottom of the crude column. In this way the charge is progressively heated and the hotter products are cooled.

Normally the charge to the treating or conversion process contains components which form deposits in the heat exchangers and, accordingly, the salt of the present invention usually is incorporated in the charge prior to entering the heat exchanger. In most cases the charge after heat exchange is subjected to fractionation to separate a particular stream for subjecting to further treating or conversion in the presence of a catalyst. Generally this stream comprises the light or intermediate components of the charge, and the heavier components of the charge are removed from the process. In most cases the salt will be retained in the bottoms product and therefore will not contact the catalyst used in the subsequent treating or conversion steps. However, the salt in the small concentrations used will not adversely affect most catalysts, and therefore would be of concern only with processes using catalysts of extreme sensitivity. As stated above, even with such catalysts, the prefractionation will serve to retain the salt in the heavier products and the salt therefore will not contact the catalyst.

Another example in which hydrocarbon oil is passed in heat exchange is in the case of jet fuel, wherein the jet fuel is passed in heat exchange with hot lubricating oil and/or with other hot fluids. Temperatures as high as 500° F. or more are encountered for at least short periods of time, with the result that deposit formation occurs and either interferes with efficient heat transfer or, in extreme cases, plugs the heat exchanger.

Although the present invention is particularly applicable for use in preventing heat exchanger deposits, it also will have applicability to improve storage stability and other properties of hydrocarbon oils. It is known that hydrocarbon oils from different origins respond differently to additives. Accordingly, the salt of the present invention may be of greater or at least of equal effectiveness in stabilizing certain hydrocarbon oils as compared to the polymer itself. Thus, in these oils, the salt serves the dual purpose of preventing heat exchanger deposits and of stabilizing the oil in which the salt is retained. In many cases improved benefits are obtained by using the salt of the present invention along with other additives including the copolymer, antioxidant, metal deactivator, corrosion inhibitor, detergent, dye, etc. The specific mixture will depend upon the particular hydrocarbon oil being treated.

While the present invention is particularly applicable to the treatment of hydrocarbon fluids, it is understood that it may be employed with other organic fluids which cause deposit formation in heat exchangers. Such other organic fluids include alcohols, aldehydes, ketones, detergents, pharmaceuticals, organic intermediates, etc.

The following examples are introduced to illustrate further the novelty and utility of the present invention but not with the intention of unduly limiting the same.

*Example I*

A copolymer comprising 80% by weight of lauryl methacrylate and 20% by weight of diethylaminoethyl methacrylate is prepared by copolymerizing these components in concentrations to yield a product having the above proportions. The polymerization is effected by heating the components at about 60° C. for 18 hours, with vigorous stirring, in the presence of benzoyl peroxide catalyst. The product is recovered as a viscous yellow liquid and, for ease of handling, is prepared as a 60% solution in kerosene.

*Example II*

An HCl salt of the copolymer solution prepared in the above manner was formed to neutralize 10% of the amino nitrogen. The salt was prepared as follows: 10 grams of the copolymer solution prepared in the manner described in Example I and 5.5 cc. of 0.0951 N alcoholic HCl were heated on a water bath, with stirring, at a temperature of about 97° C. for about one hour, following which the rest of the alcohol was removed by distillation under water pump vacuum. 12 grams of xylene was added to the product to form a final solution of 50% active ingredient, which solution had an index of refraction ($n_D^{20}$) of 1.4883.

*Example III*

As hereinbefore set forth, a copolymer prepared in the manner described in Example I is ineffective to prevent heat exchanger deposits, whereas a salt prepared in the manner described in Example II serves to reduce such heat exchanger deposits.

The heat exchanger deposits were determined according to the C.F.R. fuel coker thermal stability test. In this test, the oil heated to the specified temperature is passed through the annular space surrounding a heated inside tube of 17″ length and ½″ diameter positioned within an outside tube of 9/16″ inside diameter. The inside tube is heated by means of a heating coil positioned therein to a temperature of either 300° or 400° F. depending upon the particular fuel being evaluated. The test is conducted for 300 minutes, at a pressure of 160 pounds per square inch, and a flow rate of 6 pounds of fuel per hour. Following the run the equipment is dismantled, 13″ or less of the inner tube is marked off in 1″ increments and the deposits on the heated inner tube are rated by visual comparison with standard metal coupons. In general the rating is substantially as follows:

0  clean and bright
    1  metal dulled but not discolored
    2  light yellow discoloration
    3  yellow to tan discoloration
    4  anything darker or heavier than 3

The ratings of the individual 1″ increments are added together to give a final tube rating. Military specifications for jet fuels require that none of the 1″ increments rate poorer than 3.

The fuel used in these evaluations is a commercial heavy catalytic naphtha and was tested at a temperature of 400° F. A control sample (not containing an additive) of the naphtha gave a tube rating of 20 when evaluated in the above manner. Another sample of the naphtha containing 50 parts per million by weight, based on active ingredient, of a copolymer prepared in the manner described in Example I, when evaluated in the above manner, gave a tube rating of 20. It will be noted that this rating is the same as obtained with the control sample of the naphtha.

In contrast to the above, another sample of the naphtha containing 50 parts per million by weight of the salt prepared as described in Example II, when evaluated in the above manner, gave a tube rating of only 13.

From the above data, it will be noted that the salt was effective in reducing deposit formation, whereas the copolymer was ineffective for this purpose.

*Example IV*

The copolymer of this example is prepared by polymerizing 1000 grams of technical lauryl methacrylate, 100 grams of methacrylanilide and 60 parts of beta-diethylaminoethyl methacrylate. A total of 1200 grams of mineral oil is introduced during the polymerization. The product is recovered as a very viscous oil, and 1200 grams of mineral oil are additionally mixed with the product to form a less viscous solution. 100 grams of the above solution are mixed with 50 grams of alcoholic HCl of 0.1 N, and the mixture is heated, with stirring, to 95° C. for 2 hours. The resultant salt, in which about 10% of the amino nitrogen is neutralized, is incorporated in a fuel oil charge being passed in heat exchange with reactant effluent products in order to heat the fuel oil and to cool the effluent products.

*Example V*

The copolymer of this example was prepared by heating a mixture of 40 grams of vinyl laurate, 2 grams of allyl glycidyl ether and 0.25 grams of alpha,alpha'-azodiisobutyronitrile for 8 hours at 70° C. 2 grams of technical diamylamine were added to the reaction mixture and allowed to stand at 50° C. for 2 days. The salt of the above copolymer was prepared by mixing, with heating, an alcohol solution of HCl in a concentration sufficient to neutralize 0.5% of the basic amino nitrogen.

I claim as my invention:

1. In a process wherein two hydrocarbon fluids are passed in indirect heat exchange relationship at different temperatures through a heat exchanger, the method which comprises preventing deposit formation in said heat exchanger by incorporating in at least one of said fluids from about 1 to about 1000 parts per million by weight of an oil soluble HCl salt of a copolymer containing in combined form as its essential monomeric components a copolymerizable (1) amine-free unsaturated compound having a polymerizable ethylenic linkage and (2) an unsaturated compound having a polymerizable ethylenic linkage and a basic amino nitrogen, at least one of said monomeric components containing an aliphatic hydrocarbon side chain of from about 8 to about 18 carbon atoms and said copolymer containing a total of from about 0.1% to about 3.5% by weight of basic amino nitrogen and at least 0.2% to about 20% of the basic amino nitrogen being neutralized with HCl.

2. The method of claim 1 further characterized in that from about 1% to about 20% of the basic amino nitrogen is neutralized with HCl.

3. In a process wherein two hydrocarbon fluids are passed in indirect heat exchange relationship at different temperatures through a heat exchanger, the method which comprises preventing deposit formation in said heat exchanger by incorporating in at least one of said fluids from about 1 to about 1000 parts per million by weight of an oil soluble HCl salt of a copolymer of unsaturated compounds, each containing polymerizable ethylenic linkage and selected from the group consisting of acrylic and alkacrylic esters having from about 8 to about 18 carbon atoms in the ester group and one of said compounds containing a basic amino group, said copolymer containing from about 0.1% to about 3.5% of basic amino nitrogen and at least 0.2% to about 20% of the basic amino nitrogen being neutralized with HCl.

4. The method of claim 3 further characterized in that from about 1% to about 20% of said basic amino nitrogen is neutralized with HCl.

5. In a process wherein two hydrocarbon fluids are passed in indirect heat exchange relationship at different temperatures through a heat exchanger, the method which comprises preventing deposit formation in said heat exchanger by incorporating in at least one of said fluids from about 5 to about 100 parts per million by weight of an oil soluble HCl salt of a copolymer of lauryl methacrylate and beta-diethylaminoethyl methacrylate, said copolymer containing from about 0.1% to about 3.5% of basic amino nitrogen and at least 0.2% to about 20% of the basic amino nitrogen being neutralized with HCl.

6. The method of claim 5 further characterized in that from about 1% to about 20% of said amino nitrogen is neutralized with HCl.

7. Hydrocarbon oil containing from about 0.0005% to about 1% by weight of an oil soluble HCl salt of a copolymer containing in combined form as its essential monomeric components copolymerizable (1) amine-free unsaturated compound having a polymerizable ethylenic linkage and (2) an unsaturated compound having a polymerizable ethylenic linkage and a basic amino nitrogen, at least one of said monomeric components containing an aliphatic hydrocarbon side chain of from about 8 to about 18 carbon atoms and said copolymer containing a total of from about 0.1% to about 3.5% by weight of basic amino nitrogen and at least 0.2% to about 20% of the basic amino nitrogen being neutralized with HCl.

8. The hydrocarbon oil composition of claim 7 further characterized in that from about 1% to about 20% of the basic amino nitrogen is neutralized with HCl.

9. Hydrocarbon oil containing from about 0.0005% to about 1% by weight of an oil soluble HCl salt of a copolymer of unsaturated compounds, each containing polymerizable ethylenic linkage and selected from the group consisting of acrylic and alkacrylic esters having from about 8 to about 18 carbon atoms in the ester group and one of said compounds containing a basic amino group, said copolymer containing from about 0.1% to about 3.5% of basic amino nitrogen and at least 0.2% to about 20% of the basic amino nitrogen being neutralized with HCl.

10. The hydrocarbon oil composition of claim 9 further characterized in that from about 1% to about 20% of said basic amino nitrogen is neutralized with HCl.

11. Hydrocarbon oil containing from about 0.0005% to about 1% by weight of an oil soluble HCl salt of a copolymer of lauryl methacrylate and beta-diethylaminoethyl methacrylate, said copolymer containing from about 0.1% to about 3.5% of basic amino nitrogen and at least 0.2% to about 20% of the basic amino nitrogen being neutralized with HCl.

12. The hydrocarbon oil composition of claim 11 further characterized in that from about 1% to about 20% of the basic amino nitrogen is neutralized with HCl.

References Cited in the file of this patent

UNITED STATES PATENTS

| | | |
|---|---|---|
| 2,584,968 | Catlin | Feb. 12, 1952 |
| 2,666,044 | Catlin | Jan. 12, 1954 |
| 2,728,751 | Catlin et al. | Dec. 27, 1955 |
| 2,737,452 | Catlin et al. | Mar. 6, 1956 |
| 2,737,496 | Catlin | Mar. 6, 1956 |
| 2,839,512 | Barnum et al. | June 17, 1958 |
| 2,892,786 | Stewart et al. | June 30, 1959 |